United States Patent
SenGupta et al.

[11] Patent Number: 6,136,199
[45] Date of Patent: Oct. 24, 2000

[54] SELECTIVE REMOVAL OF PHOSPHATES AND CHROMATES FROM CONTAMINATED WATER BY ION EXCHANGE

[75] Inventors: Arup SenGupta, Bethlehem, Pa.; Dongye Zhao, Blacksburg, Va.

[73] Assignee: Julius James Jablonsky, Hatfield, Pa.

[21] Appl. No.: 09/206,446

[22] Filed: Dec. 7, 1998

Related U.S. Application Data

[60] Provisional application No. 60/069,139, Dec. 8, 1997.

[51] Int. Cl.$^7$ ........................................................ C02F 1/42
[52] U.S. Cl. ........................ 210/670; 210/683; 210/684; 210/906; 210/913
[58] Field of Search ...................................... 210/670, 683, 210/684, 906, 913

[56] References Cited

U.S. PATENT DOCUMENTS

| | | | |
|---|---|---|---|
| Re. 30,066 | 8/1979 | Oberhofer | 210/684 |
| 2,208,172 | 7/1940 | Urbain | 210/683 |
| 3,931,003 | 1/1976 | Jorgensen | 210/683 |
| 3,948,769 | 4/1976 | Dobbs | 210/681 |
| 3,961,029 | 6/1976 | Senoo | 210/684 |
| 4,080,290 | 3/1978 | Kläntschi et al. | 210/683 |
| 4,230,565 | 10/1980 | Donnert et al. | 210/683 |
| 4,734,200 | 3/1988 | Wes Berry | 210/677 |
| 4,741,832 | 5/1988 | Leonard | 210/638 |
| 4,747,949 | 5/1988 | Barkeley | 210/638 |
| 4,806,244 | 2/1989 | Guilhem | 210/638 |
| 5,618,433 | 4/1997 | Tarbet et al. | 210/634 |

OTHER PUBLICATIONS

Ramana, A. et al., "Removing Selenium(IV) and Arsenic(V) Oxyanions with Tailored Chelating Polymers", J. Environ. Eng., Sep. 1992, 118(5), 755–775.

*Primary Examiner*—Ivars Cintins
*Attorney, Agent, or Firm*—Howson & Howson

[57] ABSTRACT

Phosphates and chromates are selectively removed from contaminated water by a new class of sorbent, referred to as a Polymeric Ligand Exchanger (PLE). The exchanger bed comprising a styrene-divinylbenzene or polymethacrylate matrix having an electrically neutral chelating functional group with nitrogen or oxygen donor atoms, and a Lewis-acid type metal cation, such as copper, bonded to the chelating functional group in a manner that the positive charges of the metal cation are not neutralized. PLEs are very selective toward phosphates and chromates, chemically stable, and also amenable to efficient regeneration.

12 Claims, 15 Drawing Sheets

DOW 3N-Cu
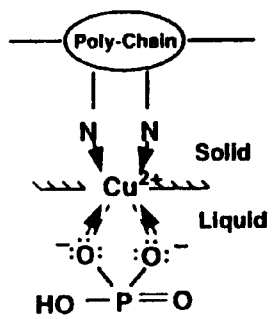
Ion Pairing + LAB
$$\Delta G^{\circ} = \Delta G^{\circ}_{IP} + \Delta G^{\circ}_{LAB}$$
IRA-958
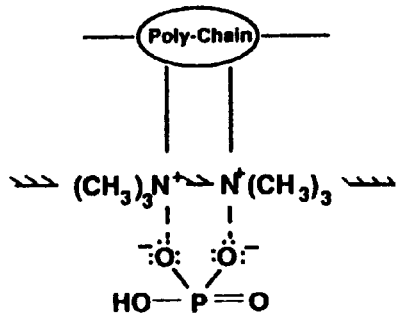
Ion Pairing
$$\Delta G^{\circ} = \Delta G^{\circ}_{IP}$$
- - - -  Ion Pairing (IP)
⟶  Lewis Acid-Base Interaction (LAB)
FIG. 6

Salient Properties of Various Sorbents

| Functional Group | Characteristic | Matrix, Porosity | Manufacture & Trade Name | Total Capacity |
|---|---|---|---|---|
| 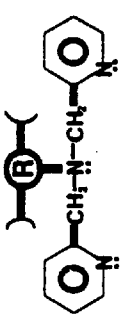 | Chelating Resin High Cu(II) Affinity | Polystyrene, Macroporous | DOW Chemical XFS 4195 or DOW 3N Midland, MI | 2.50* meq/g-dry (Copper form) |
|  | Strong Base Anion Exchanger | Polyacrylic, Macroporous | Rohm & Haas Co., Philadelphia, PA IRA-958 | 3.0* meq/g-dry (Chloride form) |
| 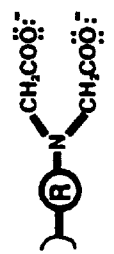 | Chelating Resin High metal-ion Affinity | Polystyrene, Macroporous | Rohm & Haas Co., Philadelphia, PA IRC-718 | 3.20* meq/g-dry (Sodium form) |

R = Repeating Monomer.
\* from our lab data; Other information was taken from the Manufacturers' manual.

FIG. 14

SELECTIVE REMOVAL OF PHOSPHATES AND CHROMATES FROM CONTAMINATED WATER BY ION EXCHANGE

CROSS-REFERENCE TO RELATES APPLICATION

This application claims the benefit of provisional application 60/069,139, filed Dec. 8, 1997.

BACKGROUND OF THE INVENTION

This invention relates to treatment of contaminated water and more particularly to the selective removal of trace concentrations of phosphates and chromates by means of a novel ion exchange material.

The presence of trace concentrations of dissolved phosphate is often responsible for eutrophication problems in lakes, reservoirs, other confined water bodies and coastal waters. Biological and physico-chemical treatment processes to remove phosphates from wastewater and other contaminated waters have been studied extensively. However, there has remained a major need for a viable fixed-bed process which can effectively eliminate phosphates. Previous investigations have shown the advantages as well as shortcomings of the fixed-bed process when strong-base anion exchangers, activated alumina and zirconium oxides are used as sorbents.

Trace amounts of phosphate (even less than one part per million) in treated wastewater from municipalities and industries are often responsible for eutrophication (excess nutrients and associated effects such as rapid growth of blue-green algae and hyacinth-like plants), which leads to short- and long-term environmental and aesthetic problems in lakes, coastal areas, and other confined water bodies. Concentrations less than 0.03 mg-P/L have been established as the criteria with regard to excessive algae growth in lakes and other confined water bodies in Switzerland (Gächter R. and Imboden D. M. (1985) Lake restoration. In Chemical Processes in Lakes. Stumm, W. (Editor), pp. 365–388. John Wiley & Sons, New York, N.Y.). A comprehensive investigation on the phosphate budget in Germany indicates that about 60 percent of the total phosphorus ending up in the aquatic ecosystem is contributed by domestic wastewater discharge ( Wolf P., et al. (1987) Stickstoff und Phosphor in Fließgewässern. Korrespondenz Abwasser, 34(11), 1215–1227. (In German) ). It is likely that a similar trend is being observed among other industrialized nations including the U.S. (Puckett L. J. (1995) Identifying the major sources of nutrient water pollution Envir. Sci. & Technol. 29(9) 408A–414A.). Very recently, the Water Environment Research Foundation prepared a detailed report that overviewed the present state of technology and identified high priority research needs pertaining to nutrient removal (Water Environment Research Foundation (1994): Research Needs for Nutrient Removal from Wastewater. Project 92-WAR-1).

Chemical Precipitation (CP) and Biological Nutrient Removal (BNR) are the two most commonly used methods for removal of phosphate from municipal and industrial wastewater (Jenkins D. and Hermanowicz S. W. (1991) Principles of chemical phosphate removal. In Phosphorus and Nitrogen Removal from Municipal Wastewater: Principles and Practice, Sedlak R. I. (Ed.); pp. 91–108. Lewis Publishers, 2nd ed., New York, N.Y.; Stensel H. D. (1991) Principles of biological phosphorus removal. In Phosphorus and Nitrogen Removal from Municipal Wastewater: Principles and Practice. Sedlak R. I. (Ed.), 2nd ed., pp. 141–163. Lewis Publishers, New York, N.Y.; Metcalf & Eddy (1991) Advanced wastewater treatment. In Wastewater Engineering: Treatment, Disposal, Reuse, Chapter 11. McGraw-Hill, Inc., New York, N.Y.). These processes essentially transfer phosphate from the liquid to the sludge phase which subsequently needs to be hauled and disposed of elsewhere. In general, CP and BNR processes are effective in reducing phosphate levels in municipal wastewater. However, these processes are sensitive to seasonal and diurnal variations in temperatures and changes in feed compositions. Also, complete removal is unattainable by CP and BNR due to thermodynamic and kinetic limitations.

In recent years, regulations on phosphate discharge have become particularly stringent in areas tributary to the Great Lakes, and semi-arid regions in the U.S. such as Arizona, Colorado, and Southern California, where wastewater reuse is in practice or being contemplated (Jenkins and Hermanowicz, 1991). In island resort areas where population and total phosphate discharge increase periodically, the use of CP and BNR processes for phosphate removal poses difficulties in adapting to fluctuating loads.

In the past, extensive research studies were also undertaken to explore the effectiveness of fixed-bed processes for phosphate removal because of their operational simplicity and adaptability to changing wastewater flowrates and compositions. Commercial anion exchangers, activated alumina, and zirconium oxides are among the well-studied sorbents. Their performances in regard to phosphate removal with varying degrees of success are well documented in the open literature (Boari G., Liberti L., and Passino R. (1976) Selective renovation of eutrophic wastes: phosphate removal. Wat. Res. 10, 421–428; Liberti L., Boari G. and Passino, R. (1976) Selective renovation of eutrophic wastes: phosphate/sulfateexchange. Wat. Res. 11 517–523; Lloyd L. and Dean R. B. (1970) Phosphorus removal from effluents in alumina columns. Jour. WPCF. 42(5) R161–172; Pollio F. X. and Kunin R. (1968) Tertiary treatment of municipal sewage effluents. Envir. Sci. & Technol. 2(1) 54–61; Urano K. and Tachikawa H. (1991) Process development for removal and recovery of phosphorus from wastewater by a new adsorbent. 2. Adsorption rates and breakthrough curves. Ind. Eng. Chem. Res. 30(8),1897–1899; Yoshida I. (1983) Studies on the selective adsorption of anion by metal-ion loaded ion-exchange resin. Separation Sci. & Technol. 18(1), 73–82). Some of the critical shortcomings with these sorbents can be summarized as follows:

(a) poor selectivity toward phosphate over other competing species, such as sulfate, chloride, bicarbonate, and dissolved organics;
(b) very low capacity in the neutral pH range;
(c) inefficient regeneration; and
(d) gradual loss in capacity due to solution of the sorbent or fouling by organic matter.

Because of these limitations, WERF (1994) recognized the need to develop and identify a viable sorbent for phosphate removal from wastewater. The sorbent in the fixed-bed process should be durable and prefer phosphate over other dissolved competing species, namely, sulfate, chloride, nitrate, bicarbonate, and dissolved organic matter (DOM), which are commonly present in wastewater at much higher concentrations than phosphate. Also, in order to be cost effective, the sorbent should be amenable to efficient regeneration so that hundreds of cycles can be run for large-scale applications.

SUMMARY OF THE INVENTION

With few exceptions, orthophosphate is by far the predominant phosphate species present in treated municipal and industrial wastewater (Snoeyink V. L. and Jenkins D. (1980) Water Chemistry. John Wiley & Sons, New York, N.Y.). At above-neutral pH, phosphate exists in the aqueous phase primarily as a divalent anion ($HPO_4^{2-}$) and is a fairly strong bidentate ligand containing two oxygen donor atoms. The ligand strength of divalent phosphate (i.e., ability to form inner sphere complexes with transition metals) is significantly greater than other inorganic anions commonly present in wastewater. The first stability constant of $HPO_4^{2-}$ with Cu(II) at a 1:1 metal to ligand ratio is quite high, i.e., log K=16.5 (Morel F. M. M. and Hering J. G. (1993) Principles and Applications of Aquatic Chemistry. John Wiley & Sons, Inc., New York, N.Y.), while the corresponding stability constants for sulfate, chloride, nitrate, and bicarbonate are orders of magnitude lower.

Transition metal cations (Lewis acids), if immobilized appropriately onto a polymer phase, will act as anion-exchange sites with relatively high affinities toward anions with strong ligand characteristics (Lewis bases), such as phosphate. From a generic viewpoint, such a sorbent is referred to as a polymeric ligand exchanger (PLE). We have discovered that a PLE can serve as an effective fixed-bed exchanger for phosphate removal with specific advantages over other previously used sorbents.

Conceptually, transition metal cations such as copper(II), if held firmly onto a solid phase at high concentration, may act as anion-exchange sites with relatively high affinities toward aqueous-phase anions with strong ligand characteristics. Thus, in a generic way, the polymeric ligand-exchange process can be viewed as the formation of a ternary complex in the polymer phase as shown below:

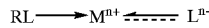

where RL is the electrically neutral polymer-phase ligand, $M^{n+}$ is the immobilized transition metal cation and $L^{n-}$ is the target atomic ligand. Coordination requirements of the metal ion are shown by arrows and are satisfied by both RL and $L^{n-}$ (Lewis bases), and at the same time electrostatic interations (or ion pair formations) are also operative between $M^n$ and $L^{n-}$ (shown by dashed lines).

We have extensively investigated polymeric ligand exchangers, with particular emphasis on phosphate sorption and recovery from wastewater. Primary constituents of the preferred PLE include: first, a durable styrene-divinylbenzene copolymer like other ion exchangers; second, a covalently bonded chelating functional group with nitrogen donor atoms derived primarily from bis-picolylamine, e.g. bi-pyridyl, functional groups; and third, a Lewis-acid type metal cation, e.g. copper, strongly coordinated to the chelating functional group in a manner that its positive charges are not neutralized. The experiments described in detail below were carried out with a copper (II)-loaded Dow 3N ion exchange resin. For convenience, the copper(II)-loaded Dow 3N will be referred to as Dow 3N—Cu or PLE.

Briefly, in accordance with the invention, contaminated water is passed through an ion exchange bed comprising a chemically stable polymer matrix having an electrically neutral chelating functional group with donor atoms from the group consisting of oxygen atoms and nitrogen atoms, and a Lewis-acid type metal cation bonded to the chelating functional group in a manner that the positive charges of the metal cation are not neutralized.

The principles of the invention can be applied to the selective removal of phosphates and analogous anionic ligands, especially chromates.

BRIEF DESCRIPTION OF THE DRAWINGS

FIG. 6 is a schematic diagram illustrating binding mechanisms of phosphate onto two different sorbents;

FIG. 14 is a table presenting the salient properties of various sorbents including Dow 3N—Cu.

DETAILED DESCRIPTION

All of the publications cited herein are incorporated by reference, including Zhao D. (1997) Enhanced Sorption of Trace Anionic Ligands Through Polymeric Ligand Exchange: A Model Study Using Phosphate as a Representative Ligand. Ph.D. Dissertation, Civil & Environmental Engineering Department, Lehigh University, Bethlehem, Pa., USA.

Figure 1:
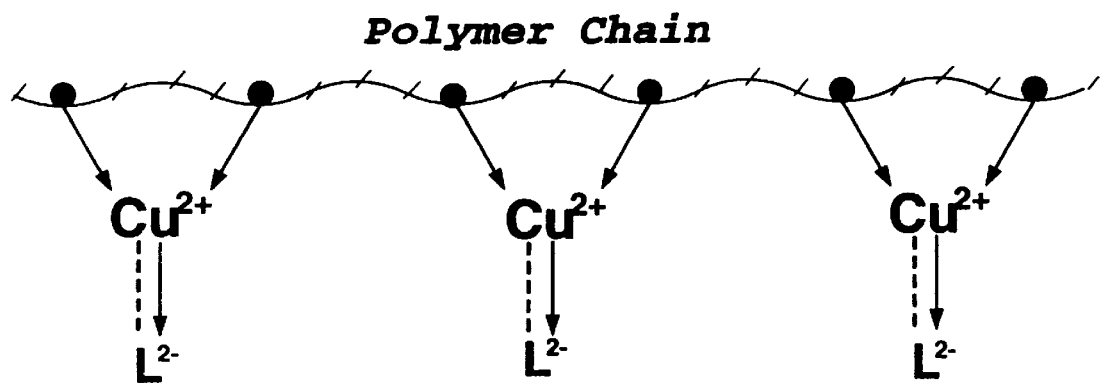
FIG. 1 is a schematic diagram illustrating selective uptake of an anionic ligand ($L^{2-}$) onto a polymeric ligand exchanger.

FIG. 1 illustrates the binding of a divalent ligand ($L^{2-}$) onto a PLE. Both electrostatic interaction, that is ion-pairing (IP), and Lewis acid-base (LAB) interactions are concurrently operative, leading to enhanced sorption of phosphate. The overall free energy change for the binding of $L^{2-}$ onto the PLE may be presented as follows:

$$\Delta G°overall = \Delta G°_{IP} + G°_{LAB}$$

where $\Delta G°_{OVERALL}$ represents overall free energy changes at the standard state, and the subscripts IP and LAB refer to contributions from ion pairing and Lewis acid-base interaction, respectively.

It follows that $$-RT \ln K_{overall} = -RT \ln K_{IP} - RT \ln K_{LAB}$$

or $$K_{overall} = K_{IP} K_{LAB}$$

where R is the universal gas constant, T is the absolute temperature, and the Ks are the respective equilibrium constants. With all other conditions remaining identical, an anion-like phosphate with a fairly strong Lewis-base characteristic (i.e., high $K_{LAB}$ will show high selectivity toward this synthetic sorbent.

The fixed-bed process of the invention can achieve a practically zero-phosphate level in the treated water, can recover phosphate as a high-value fertilizer, and can allow the reuse of the regenerant for multiple cycles. Experiments have validated selective sorption of phosphate onto this new ion exchanger using synthetic and municipal wastewater, and have validated the effectiveness of in-situ regeneration, regenerant recycling, and phosphate recovery. We have compared the sorption behaviors of PLEs with a previously used anion exchanger. While not intending to be bound by any particular theory, we believe we have discovered the underlying sorption mechanism of the PLE.

A specialty chelating resin (Dow 3N) containing only nitrogen donor atoms was used as the parent polymer for preparing the copper(II)-loaded PLE. The very high affinity of this resin toward copper(II) and very little copper leakage, once loaded, have been discussed elsewhere (SenGupta A. K., Zhu Y., and Hauze D. (1991) Metal (II) ion binding onto chelating exchanger with nitrogen donor atoms Envir. Sci. Technol. 25(3), 481–488). For comparison, another commercially available resin, IRA958 (a strong-base anion exchanger) was studied. FIG. 14 presents salient properties of these sorbents. Anion exchangers similar to IRA-958 were used in both laboratory and pilot-plant studies in Italy for phosphate removal from municipal wastewater (Boari et al., 1976; Liberti et al., 1976).

The ion-exchange resins used in the study were obtained in spherical forms with sizes varying from 0.3 to 0.8 mm. They were conditioned following the standard procedure of cyclic exhaustion with 1N hydrochloric acid and 1N sodium hydroxide. Dow 3N was then converted into copper(II)-loaded form by passing 500 mg/L Cu(II) solution at a pH of 4.5 through the resin in a column until saturation. The solubility product of copper(II) hydroxide was not exceeded at this pH. Analytical grade $CuSO_4 \cdot 5H_2O$ and $CuCl_2 \cdot 2H_2O$ (Fisher Chemical) were used. The resins loaded with cupric sulfate were primarily used for binary isotherm tests involving sulfate as the competing ion, while resins loaded with cupric chloride were used for column exhaustion runs as well as for the equilibrium experiments where chloride was the primary competing ion. Following copper loading, the resin was rinsed with distilled water and air-dried for use.

With a chelating polymeric exchanger, it is extremely difficult to maintain a constant pH during batch equilibrium tests. Therefore, all the equilibrium data for PLE were generated by the minicolumn technique where solutions with fixed compositions and pH were passed through short glass columns containing about 0.15 to 0.2 g of the resin in question at room temperature (23±2° C.). Further details of the procedure have been provided in Zhu Y. (1992) Chelating Polymers with Nitrogen Donor Atoms: Their Unique Properties in Relation to Heavy Metals Sorption and Ligand Exchange. Ph.D. Dissertation, Civil & Environmental Engineering Department, Lehigh University, Bethlehem, Pa., and Zhu Y. and SenGupta A. K. (1992) Sorption enhancement of some hydrophilic solutes through polymeric ligand exchange. Envir. Sci. & Technol. 26(10), 1990–1997.

Fixed-bed column runs were carried out using PLEXIGLAS columns (11 mm in diameter), constant-flow stainless steel pumps and an ISCO fraction collector. The ratio of column diameter to exchanger bead diameter was approximately 20:1. Earlier work on chromate removal with a similar set-up showed no premature chromium leakage due to wall effects under identical experimental conditions (SenGupta A. K. and Lim L. (1988) Modeling chromate Ion-exchange process. AIChEJ. 34(12), 2019–2029.). The superficial liquid velocity (SLV) and the empty bed contact time (EBCT) were recorded for each column run.

Figure 2:
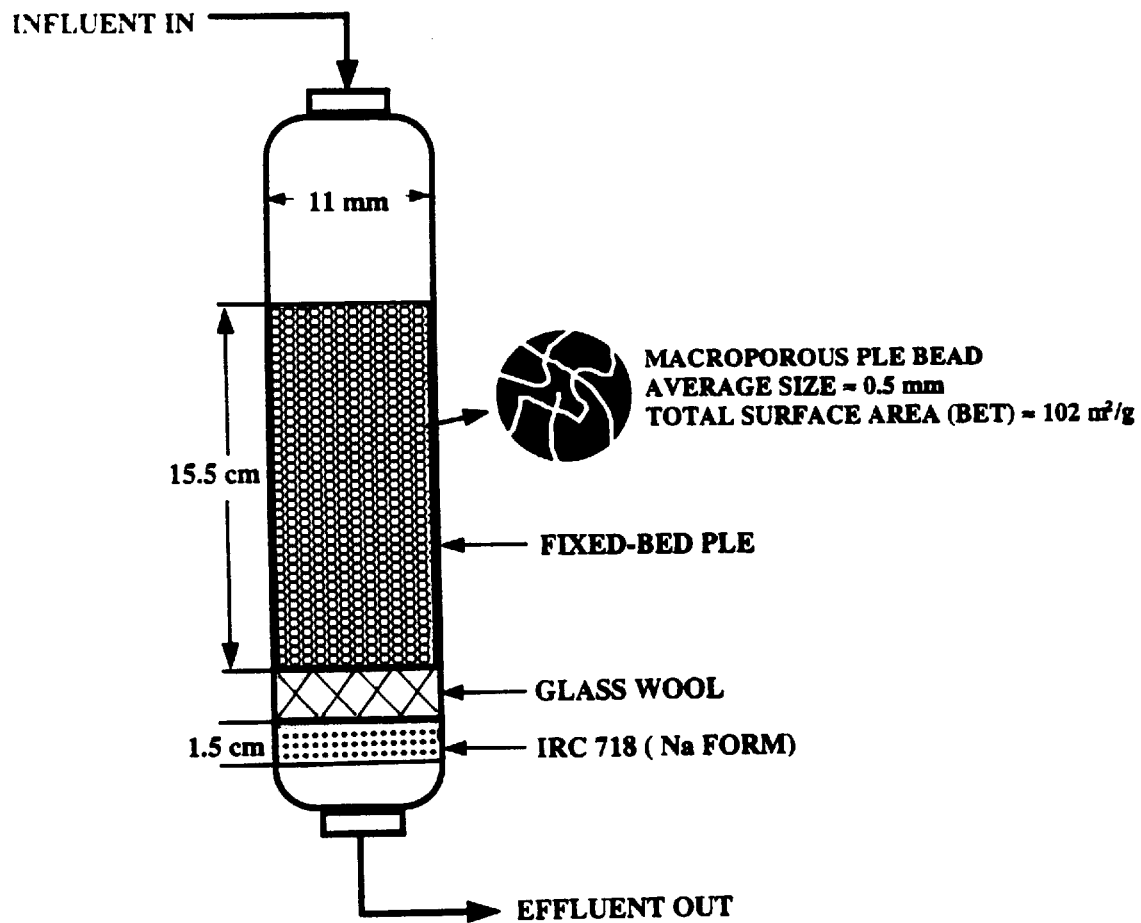
FIG. 2 is a schematic diagram of an experimental fixed-bed set-up for the polymeric ligand exchanger.

FIG. 2 provides a general view of the fixed-bed column. In order to avoid any possible bleeding of copper from the Dow 3N—Cu bed into the exit of the column, a small amount (about 10% of the total bed height) of a virgin chelating ion exchanger (IRC-718, Rohm and Haas Co., Philadelphia) in sodium form was kept at the bottom of the column. IRC-718 is essentially a chelating cation exchanger with iminodiacetate functional group and polystyrene matrix. Its salient properties are provided in FIG. 14.

Sodium chloride solution (6% w/v, or about 1M) was used as the regenerant. In order to explore the possibility of reuse of the regenerant and phosphate recovery, the PLE column was first exhausted with a synthetic feed solution containing sulfate, nitrate, chloride, bicarbonate, and phosphate in concentrations representative of the secondary wastewater of Bethlehem, Pennsylvania Wastewater Treatment Plant (BWTP). A portion of the bed (approximately 4.3 mL) was regenerated with approximately 15 bed volumes of 6% NaCl. Following phosphate analysis, stoichiometric amounts of ammonium chloride ($NH_4Cl$) and magnesium chloride ($MgCl_2 \cdot 6H_2O$) were added to the spent regenerant to precipitate phosphate as magnesium ammonium phosphate. An Imhoff cone was used to settle the precipitate for approximately one hour. The supernatant was decanted off and analyzed for phosphate and sulfate. Eighty percent of the supernatant and twenty percent of the fresh regenerant (i.e., 6% NaCl) were subsequently used to regenerate an equal volume (4.3 mL) of the remaining exhausted Dow 3N—Cu.

Phosphate was analyzed by the stannous chloride colorimetric procedure (APHA, AWWA, WEF (1992) Standard Methods for the Examination of Water and Wastewater, 18th Ed., Am. Public Health Ass., Am. Water Works Ass., and Water Environ. Fed., Washington D.C.). For the secondary wastewater from BWTP, analyses were performed according to Standard Methods (APHA, AWWA, WEF, 1992) to confirm that orthophosphate is the major phosphate species, and that polyphosphate is negligible. Sulfate, chloride, and nitrate were analyzed using a Dionex Ion Chromatograph (Model 4500i). Dissolved Organic Carbon and inorganic carbon analyses were conducted with a TOC Analyzer (Dohrman model DC-190). Copper(II) was determined using an Atomic Adsorption Spectrophotometer (Perkin Elmer Model 2380). A flame mode or graphite furnace was employed according to the copper concentrations. Pore-size distribution and cumulative BET surface area analyses of PLE in nitrate and phosphate forms were carried out externally by the Porous Materials Inc. in Ithaca, N.Y.

Figure 3:
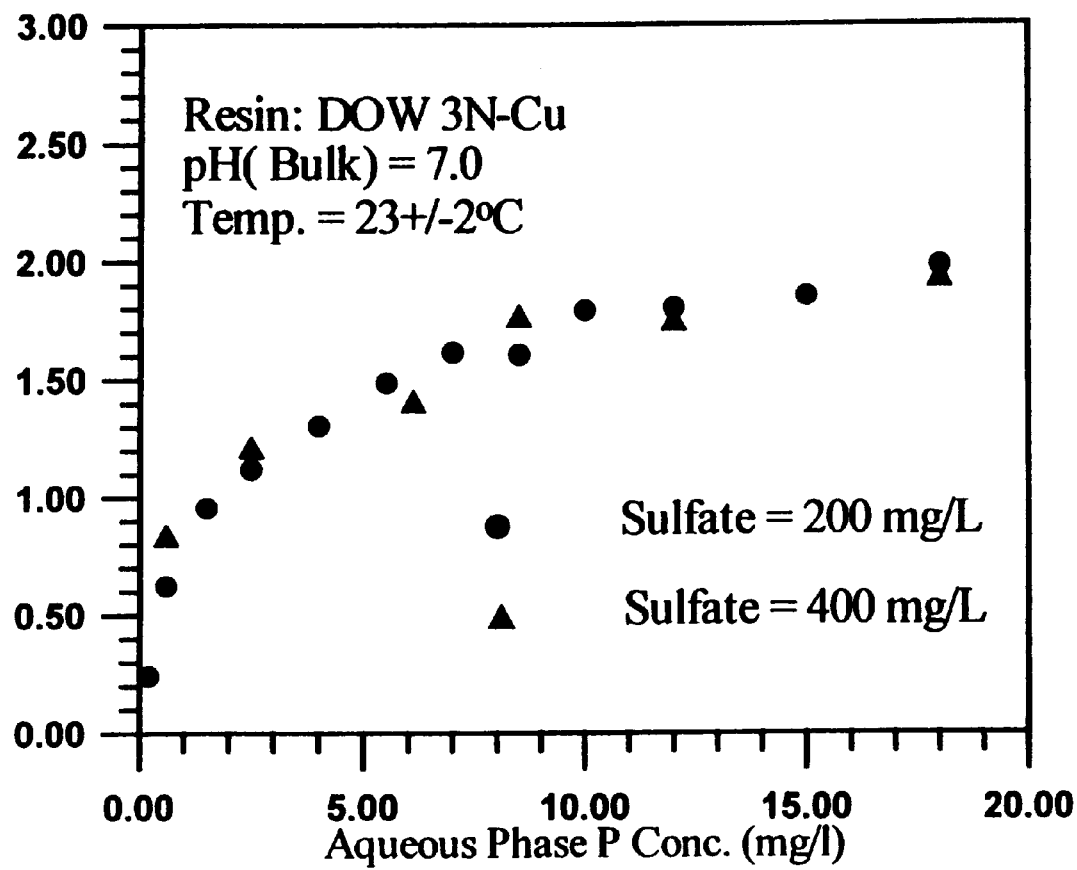
FIG. 3 is a graph showing the phosphate isotherms for Dow 3N—Cu resin at two different background concentrations (200 mg/L and 400 mg/L) of sulfate.

Municipal and industrial wastewater always contains sulfate and chloride anions which will compete with target phosphate for the sorption sites. Of these anions, sulfate possesses higher ionic charges (i.e., divalent) and will offer greater competition through enhanced electrostatic interaction. To assess the competing effects of sulfate on the phosphate uptake of the PLE, isotherm tests using the minicolumn technique were conducted at two different background sulfate concentrations, namely, 200 mg/L and 400 mg/L, with other conditions remaining identical. FIG. 3 shows the phosphate uptakes for these two separate isotherm tests. Doubling the concentration of the competing sulfate ion had an insignificant effect on the phosphate removal capacity of the PLE.

Figure 4:
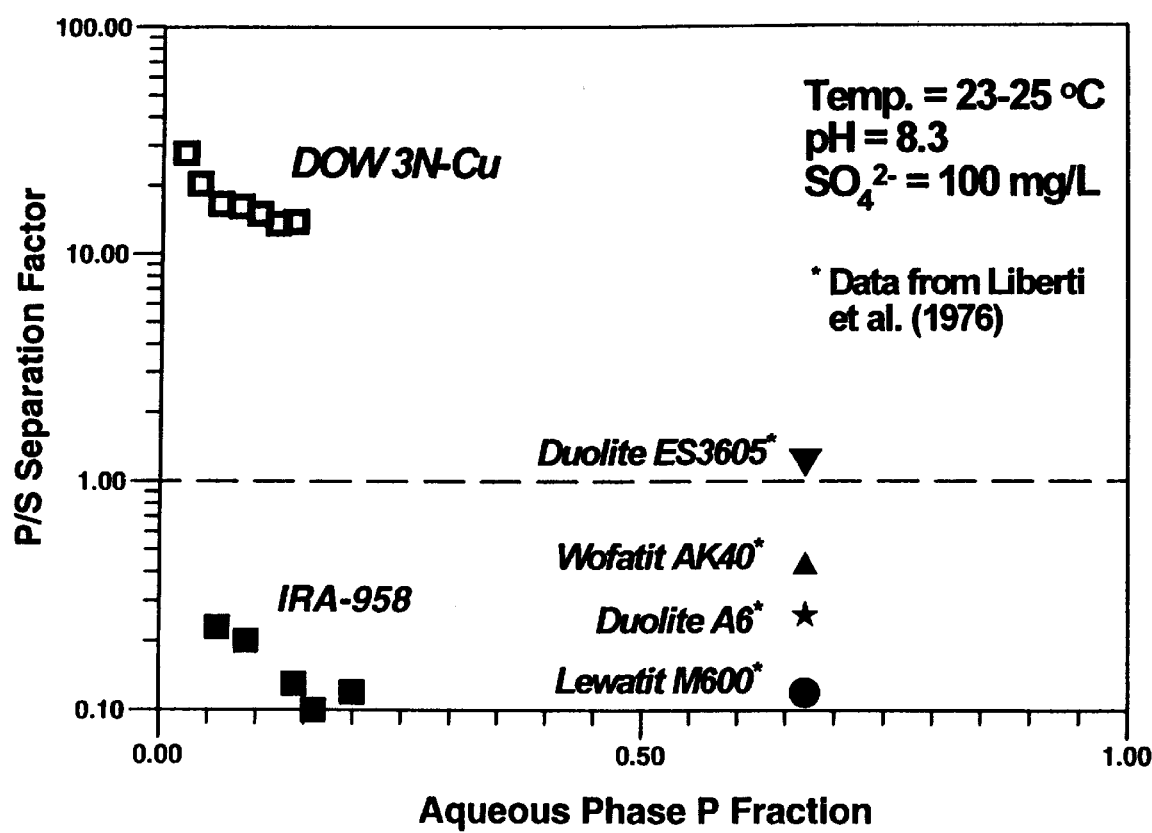
FIG. 4 is a graph comparing phosphate/sulfate (P/S) separation factors for various sorbents including Dow 3N—Cu.

Phosphate-sulfate separation factors, as computed from the experimental data, are provided in FIG. 4. Also superimposed in FIG. 4 are the experimentally determined separation factors of other anion exchangers studied previously (Boari, et al., 1976; Liberti, et al., 1976). A separation factor is a measure of relative selectivity between two competing solutes and is equal to the ratio of their distribution coefficients between the exchanger phase and the aqueous phase. Thus, the phosphate/sulfate separation factor ($\alpha_{P/S}$) can be expressed as $$\alpha_{P/S} = \frac{q_P}{C_P} * \frac{C_S}{q_S}$$

Where q and C represent the concentrations (molar or equivalent) in the polymer phase and aqueous phase, respectively. Subscripts P and S denote phosphate and sulfate, respectively. Although both phosphate and sulfate exist as divalent anions at a pH equal to 8.3, the average separation factor, $\alpha_{P/S}$, with PLE is well over an order of magnitude greater compared to IRA-958 and other sorbents studied by Liberti et al (1976).

Figure 5:
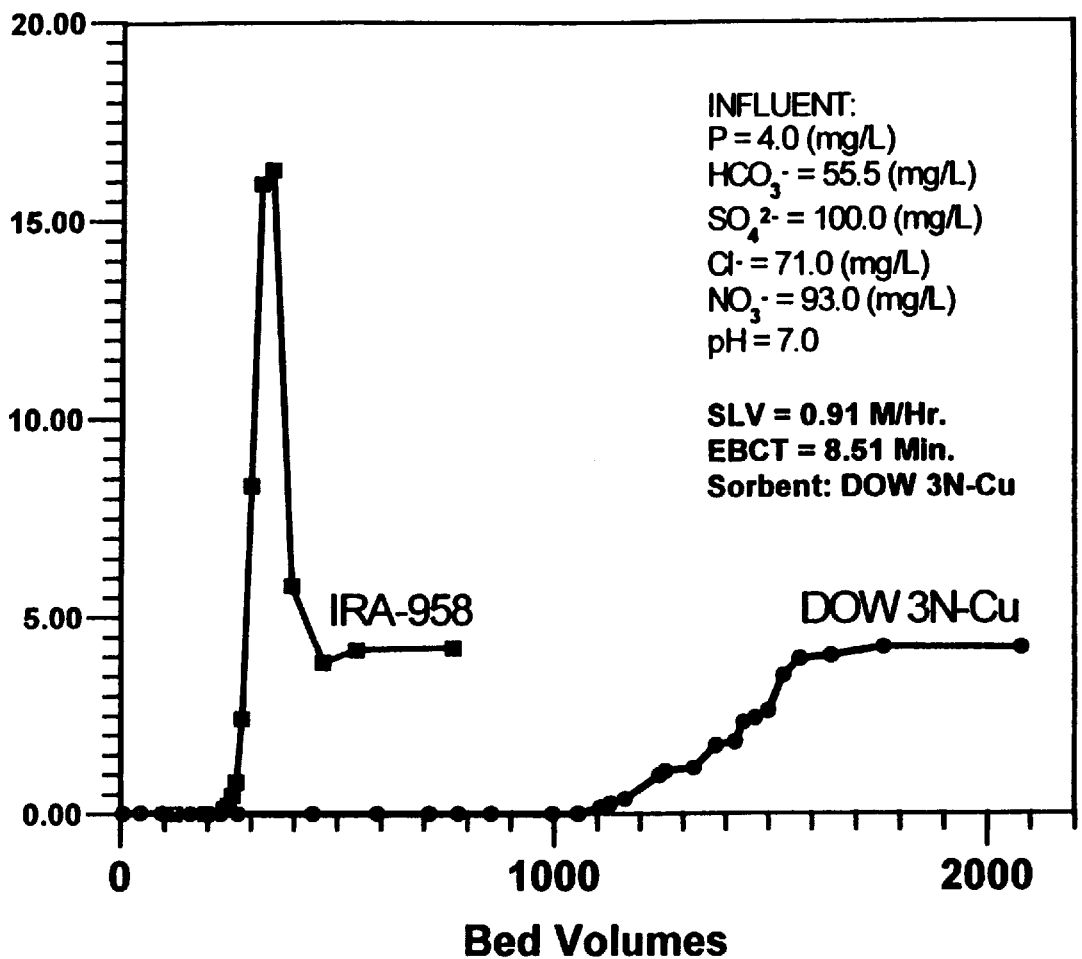
FIG. 5 is a graph comparing phosphate breakthrough histories for IRA-958 and Dow 3N—Cu during column runs with simulated wastewater, in which SLV is Superficial Liquid-Phase Velocity, and EBCT is Empty Bed Contact Time.

FIG. 5 shows effluent histories of phosphate during separate column runs with two different sorbents, a strong base polymeric anion exchanger with quaternary ammonium functional groups (IRA-958) and the polymeric ligand exchanger, Dow 3N—Cu. For both column runs, influent compositions, pH, and hydrodynamic conditions, namely, Empty Bed Contact Time (EBCT) and Superficial Liquid Velocity (SLV) were identical and are provided in FIG. 5. IRA-958 removed phosphate up to 250 bed volumes. In comparison, the phosphate breakthrough of Dow 3N—Cu took place well after 1000 bed volumes although competing anions, namely, chloride, sulfate, nitrate and bicarbonate were present at concentrations 10–20 times greater than target phosphate. It is noteworthy that phosphate underwent chromatographic elution for the IRA 958 column run. That is, the concentration of phosphate in the effluent, immediately after breakthrough, became significantly greater than its influent concentration of 4.0 mg/L. This observation is consistent with IRA-958'S preference for sulfate over phosphate which causes both early breakthrough and chromatographic elution of phosphate.

Results of the sorption isotherms in FIG. 3, the separation factors data in FIG. 4, and the column run results in FIG. 5 clearly demonstrated that the Polymeric Ligand Exchanger is a more effective sorbent for phosphate removal compared to the strong base anion exchanger (IRA-958). FIG. 6 illustrates what we believe to be the underlying mechanisms for phosphate bindings onto IRA-958 and Dow 3N—Cu and may help substantiate the experimental findings as follows.

For the PLE, two coordination sites of each copper(II) are satisfied by the two pyridyl nitrogen donor atoms of the chelating functional group, and as a result, copper ions are held firmly onto the polymer surface. The remaining two coordination sites and the two residual positive charges of the immobilized copper(II) ion are satisfied by one $HPO_4^{2-}$ ion. Thus, coulombic interaction (i.e., ion-pair formation for maintenance of electroneutrality) is accompanied by Lewis acid-base interaction in a bidentate fashion where electron deficiencies in the coordination spheres of copper(II) (Lewis acid) are satisfied by the two donor oxygen atoms of $HPO_4^{2-}$. As a result, the phosphate affinity of the PLE is greatly enhanced.

For IRA-958, only the coulombic interaction (ion pairing) is involved between the positively charged, quaternary ammonium group ($R_4N^+$) and the target anion ($HPO_4^{2-}$).

Since the functional group, $R_4N^+$, does not have any Lewis acid (electron pair acceptor) characteristic, the sorption affinity of $HPO_4^{2-}$ onto IRA-958 or other strong base anion exchangers cannot be enhanced through Lewis acid-base interactions.

Figure 7:
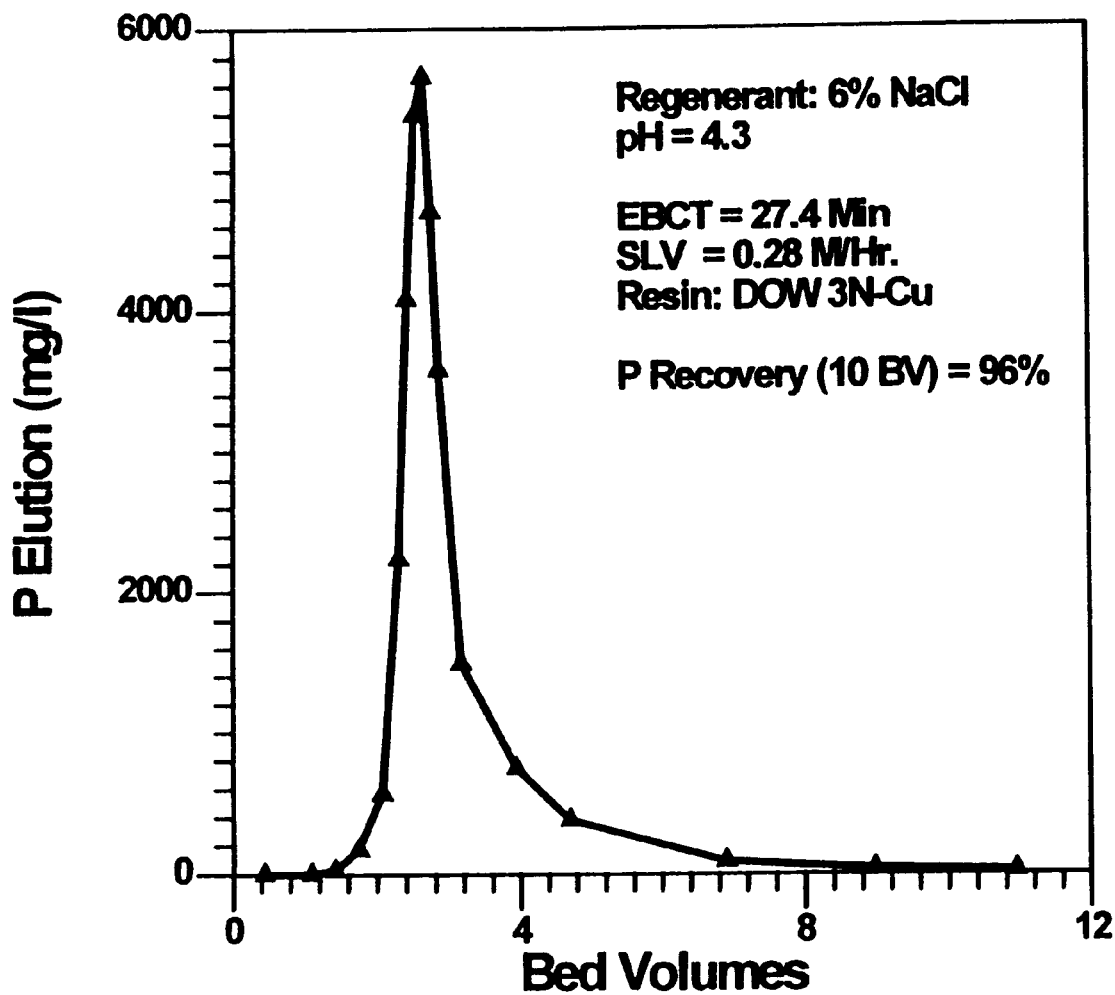
FIG. 7 is a graph showing the phosphate elution profile during regeneration of saturated Dow 3N—Cu using brine.

Following some experimental trial and error, 6% NaCl at a pH equal to 4.3 was found to be an efficient (and also inexpensive) regenerant for the exhausted PLE. FIG. 7 shows the phosphate concentration profile during regeneration following the lengthy column run in FIG. 5. The phosphate desorption was very efficient, and approximately 96% of phosphate was recovered from the bed in less than eight bed volumes. It is postulated that the following are the most predominant exchange reactions during the regeneration process:

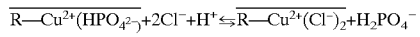

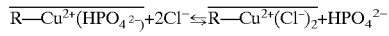

where "R" represents the repeating unit of the PLE with bi-pyridyl functional group.

Both electroselectivity reversal at the high ionic strength of the regenerant (6% NaCl) and lower affinity of monovalent phosphate, $H_2PO_4^-$, at the prevailing pH, are the underlying reasons for efficient phosphate regeneration. According to the selectivity reversal phenomenon, the selectivity of a monovalent counter-ion (chloride in this case) toward the exchanger is enhanced compared to counter-ions of higher valences ($HPO_4^{2-}$ or $SO_4^{2-}$ in this case) at high aqueous phase electrolyte concentrations. The exit pH during the entire period (about 10 bed volumes) of the co-current regeneration remained between 6.0 and 7.0 (This pH is higher than that in the influent, which is attributable to the residual elution of sorbed $HCO_3^-$ and $OH^-$). Practically no copper leakage from the bed was detected.

Figure 8:
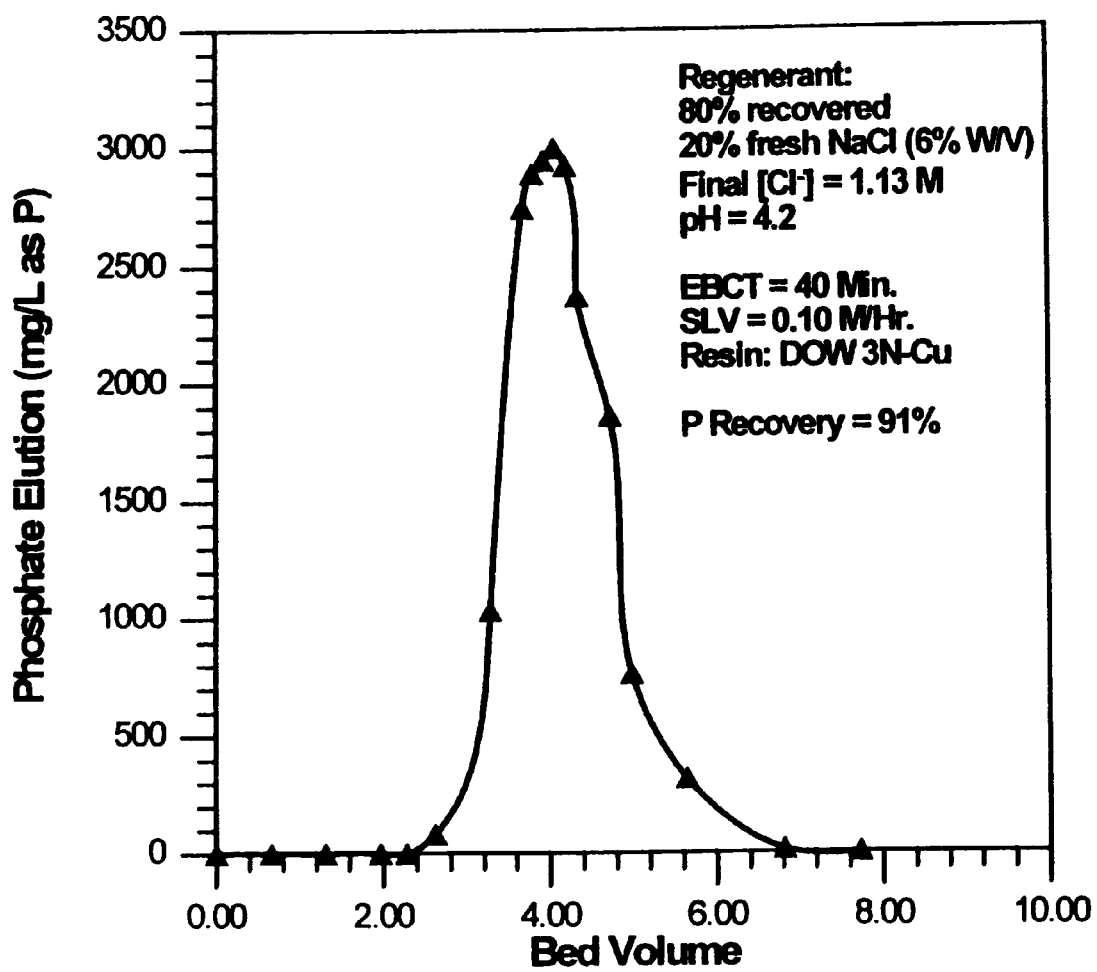
FIG. 8 is a graph showing a phosphate elution profile during regeneration using recovered regenerant.

As described earlier, eighty percent of the spent regenerant and twenty percent of the fresh regenerant (6% NaCl) were used for regeneration of the exhausted Dow 3N—Cu. FIG. 8 shows the phosphate concentration profile during regeneration with the reused regenerant. 90 percent phosphate recovery was attained in less than eight bed volumes. The concentrations of chloride, phosphate and sulfate in the spent regenerant after phosphate precipitation were: $Cl^-$= 40,115 mg/L (or 1.13 M), P=0.06 mg/L, and $SO_4^{2-}$=293 mg/L. Phosphate is almost completely removed from the spent regenerant, and sulfate concentration is over two orders of magnitude lower than that of chloride. In fact, chloride concentration in the reused regenerant was about the same as that in the fresh regenerant because magnesium chloride and ammonium chloride (or potassium chloride) added for phosphate precipitation replenished the loss of chloride during regeneration. Since chloride is the primary component in the regenerant, the portion of fresh make-up in the reused regenerant may be reduced well below 20% for multiple cycles. Magnesium ammonium phosphate ($MgNH_4PO_4$) precipitate was found to be 99% pure based on its phosphorus content and may be used as a high purity slow-release fertilizer.

Figure 9:
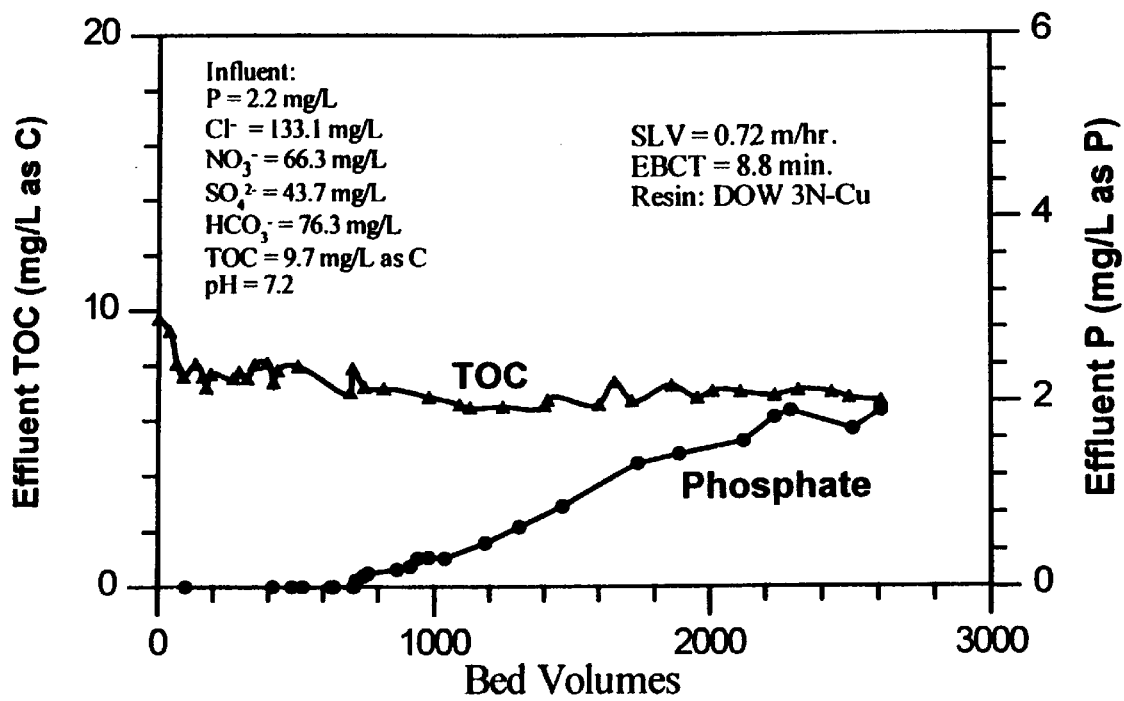
FIG. 9 is a graph of TOC and phosphate breakthrough curves during the treatment of secondary wastewater using Dow 3N—Cu.

Selective phosphate removal from secondary wastewater is gaining importance in many industrialized nations (Liberti, Boari, and Passino, 1976). The long-term viability of the proposed process using PLE is, however, influenced by the nature and intensity of interactions between DOM in the secondary wastewater and the sorption sites of the PLE. In a typical secondary wastewater after the biological treatment, the DOM is derived primarily from the residuals of protein, carbohydrates, fats and soluble microbial products (Chudoba J. (1985) Quantitative estimation in COD units of refractory organic compounds produced by activated sludge microorganisms. Wat. Res. 19(1), 37–43. Haldane G. M. and Logan B. E. (1994) Molecular size distributions of a macromolecular polysaccharide (dextran) during its biodegradation in batch and continuous cultures. Wat. Res. 28(9), 1873–1878. Rittman B. E. et al. (1987) A critical evaluation of microbial product formation in biological processes. Wat. Sci. Technol. 19, 517–528). The hydrophobic, electrostatic, and ligand properties of these individual DOM molecules influence their abilities to compete for sorption sites in the PLE. In order to monitor the direct impact of DOM on phosphate removal by Dow 3N—Cu, a lengthy column run was carried out using secondary wastewater obtained from the Bethlehem Wastewater Treatment Plant (BWTP). FIG. 9 provides the effluent histories of phosphate and Dissolved Organic Carbon (DOC) during the column run. The composition of the secondary wastewater is also provided in FIG. 9. Phosphate concentration was 2.2 mg/L as P, while that of DOC was 9.7 mg/L. While phosphate breakthrough took place after about 800 bed volumes, DOC was poorly adsorbed and broke through almost immediately after the beginning of the column run. Also, no chromatographic elution was observed for phosphate breakthrough, i.e., the phosphate concentration at the exit of the column after breakthrough never exceeded its influent concentration. This observation confirms that DOMs and other anions commonly present in secondary wastewater have a lower affinity toward the PLE compared to phosphate. Earlier pilot-plant studies with strong-base anion exchangers, however, revealed conclusively that sulfate and certain components of DOM are preferred over phosphate, thus demanding frequent regeneration (Eliassen R. and Tchobanoglous G. (1968) Chemical processing of wastewater for nutrient removal. Jour. WPCF. 40(5), R171–180. Kang S. J. (1990) RIM-NUT Demonstration Project U.S. EPA. Grant No. R-005858-01 McNamee, Porter & Seeley, Ann Arbor, Mich.).

According to Rebhun M. and Manka J. (1971) Classification of organics in secondary effluents. Envir. Sci.Technol. 5, 606–609, proteins and protein derivatives constitute the single largest class of DOM in secondary wastewater. At near-neutral pH, they exist predominantly as cationic amino compounds and are therefore rejected by the PLE, which is essentially an anion exchanger with fixed positive charges. The portion of the DOM which is non-ionized (i.e., electrically neutral) has very poor affinity because of its inability to interact electrostatically with the sorption sites of the PLE. The anionic constituents of DOMs are sorbable onto the PLE, but their ligand strength (Lewis base characteristic) is either weaker or comparable to that of phosphate. Thus the phosphate removal capacity of PLE is supposedly only marginally affected by the presence of DOM in treated secondary wastewater. That is the most plausible reason why phosphate removal during the column run (FIG. 9) continued for over 800 bed volumes even though the concentration of DOM (9.7 mg/L as carbon) was greater than that of phosphate (2.2 mg/L as P).

Figure 10A:
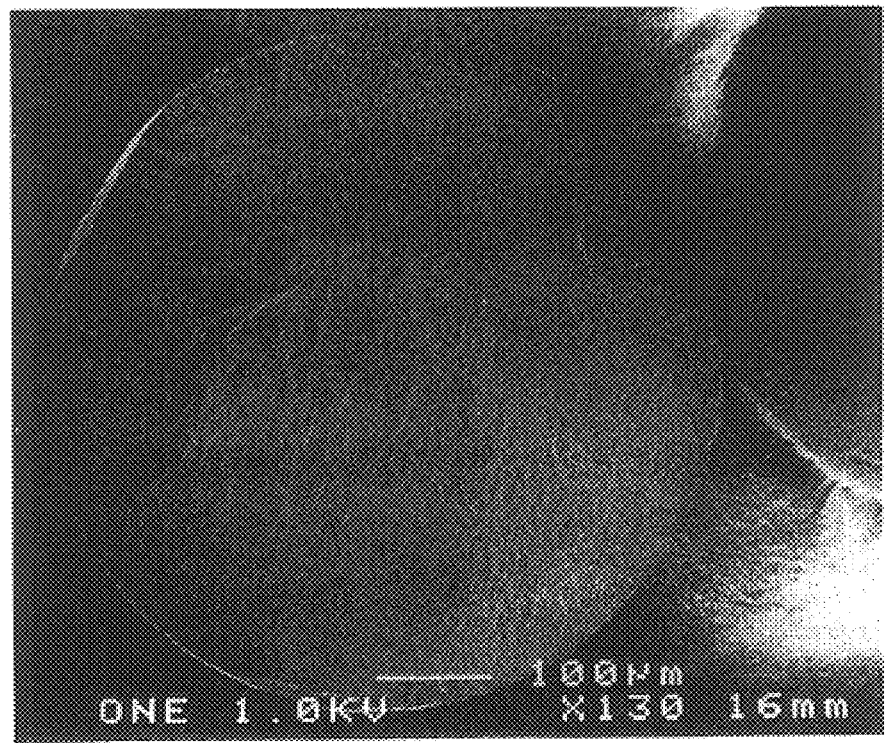
FIG. 10A is a scanning electron micrographs of a PLE bead at a magnification of 100×.
Figure 10B:
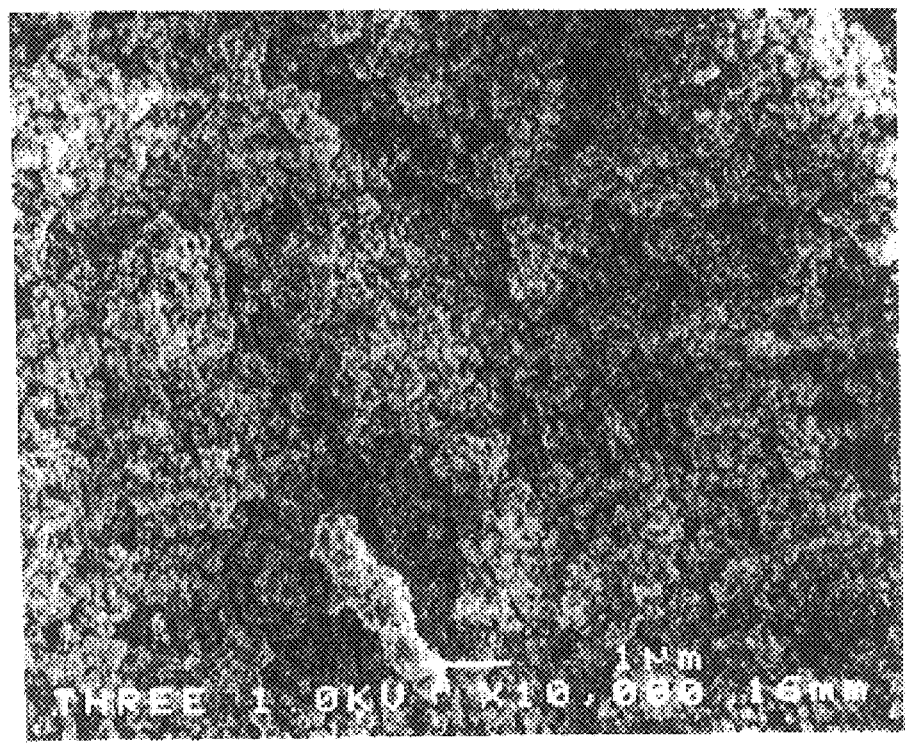
FIG. 10B is a scanning electron micrographs of a PLE bead at a magnification of 20,000×.

Also noteworthy is the fact that the macroporous PLE is essentially a heterogeneous spherical bead where agglomerated microgels (less than 20 microns) are essentially separated from each other by macropores in the order of 0.05 microns (Kunin R. (1970) Pore structure of macroreticularion-exchange resins. In Ion Exchange in Process Industries, pp. 10–22. Society of Chemical Industry, London). FIGS. 10A and 10B show a single PLE bead at magnifications of 100× and 20,000×, respectively. Many segregated gel phases can be noticed in FIG. 10B with macropores in between. During the desorption step, these macropores provide enhanced passage leading to increased diffusivity of macromolecules. As a result, macroporous polymeric beads like PLE are less susceptible to organic fouling (Symons J., Fu P., and Kim P. (1995) Sorption and desorption behavior of natural organic matter onto strong-base anion exchangers. In Ion Exchange Technology. Arup K. SenGupta (Ed.), Chapter4, pp. 149–192. Technomic Publishing Co., Lancaster, Pa.).

Figure 11:
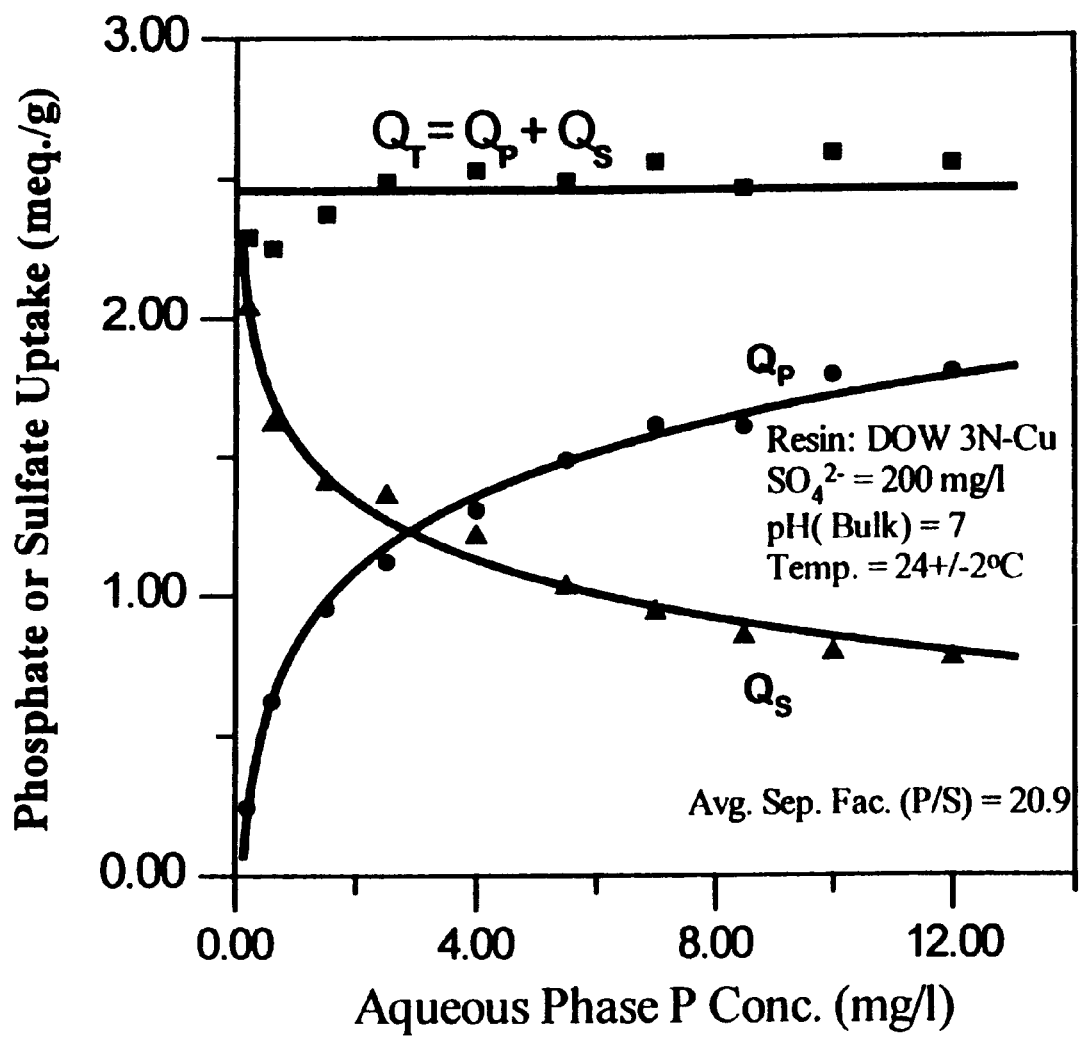
FIG. 11 is a graph showing equivalent stoichiometry of phosphate-sulfate exchange.

In view of the chemical characteristic (copper loading) of the sorbents used in the study, it was necessary to verify whether the uptake of phosphate in the polymer phase takes place through the exchange of anions on an equivalent basis or through the precipitation of sparingly soluble copper(II) phosphate ($K_{sp}=1.3\times10^{-37}$) on the surface. FIG. 11 presents the binary isotherm data at a pH of 8.3, showing phosphate and sulfate loadings on Dow 3N—Cu in equivalent units ($q_p$ and $q_s$ in milliequivalents per gram resin). The equivalent concentrations were determined considering $HPO_4^{2-}$ and $SO_4^{2-}$ to be the predominant counter-ions. The total capacity Q, in milliequivalents per gram of resin ($Q=q_p+q_s$), remains essentially constant for a wide range of aqueous phase phosphate concentrations. This observation suggests that the phosphate uptake of PLE follows ion-exchange stoichiometry, i.e., any sorption of phosphate is accompanied by desorption of an equivalent amount of sulfate, and precipitation is not responsible for the selective phosphate removal.

Figure 12:
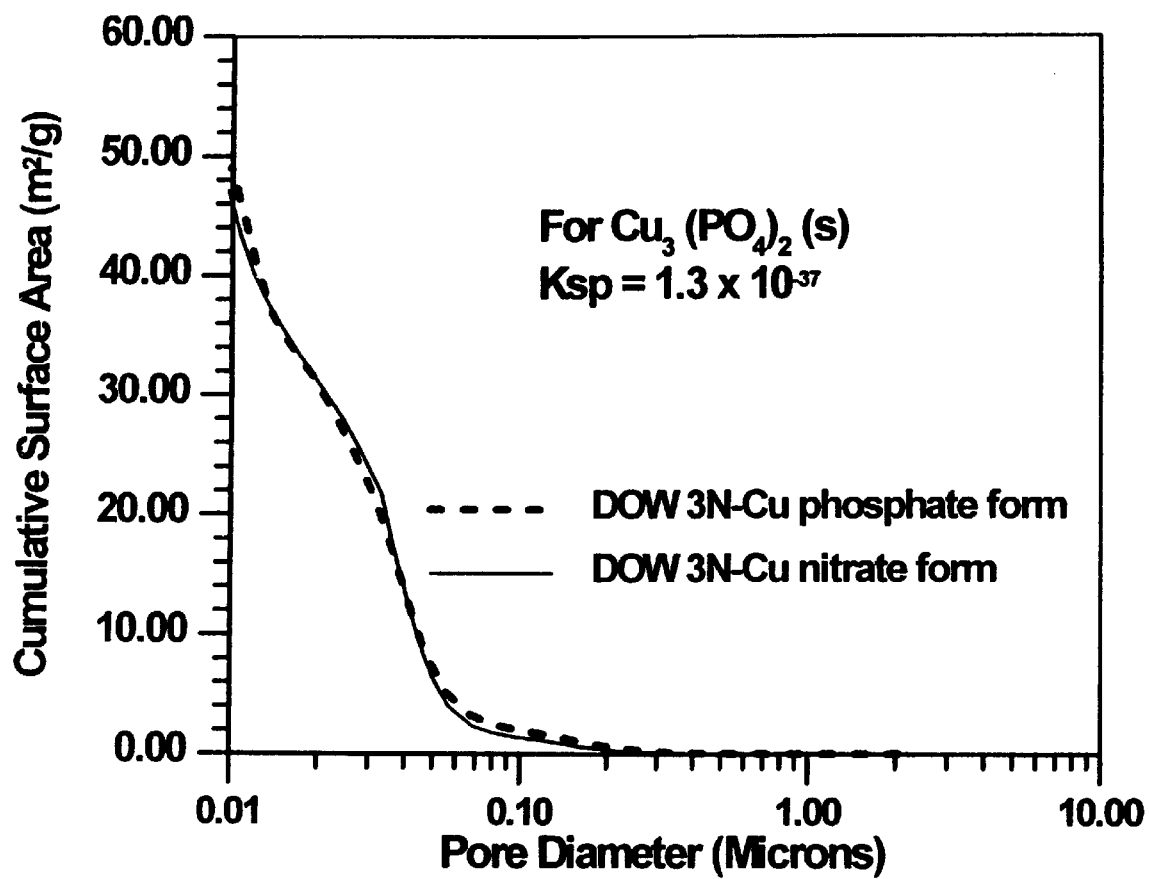
FIG. 12 is a graph showing the cumulative surface areas of Dow 3N—Cu in phosphate and nitrate forms.

A close examination of the polymeric ligand exchanger during lengthy column runs did not show any evidence of external precipitation. Phosphate precipitation could, however, take place within the micropores/interstices of the polymeric ligand exchanger. In order to prove or discount such a possibility, Dow 3N was first converted into a PLE by loading with Copper(II) in nitrate form (Dow 3N—Cu—$NO_3$). A portion of the PLE in nitrate form was subsequently taken in a minicolumn and loaded with phosphate by passing a phosphate solution at a pH=7.0 (5.0 mg/L as P) through the column until the attainment of equilibrium. Finally the PLE in nitrate form and the phosphate-loaded PLE, after necessary pretreatment, were separately analyzed for pore-size distribution using the mercury porosimetry technique. FIG. 12 shows the cumulative surface area versus pore diameters of these two samples for pore sizes between 0.01 and 2 microns. Pore distribution analysis showed that more than 90% of the pore sizes fall into this range. Practically no difference exists between the two curves in FIG. 12. This observation in conjunction with other isotherm and column run data strongly suggests that precipitation was absent in the tiny pores of the polymeric ligand exchanger and that phosphate uptake took place through the equivalent exchange of counter-ions.

In order for the polymeric ligand-exchange process to be operationally viable, the bleeding of Cu(II) from the polymer phase during both service and regeneration cycles has to be minimal, if not absent altogether. During the lengthy column runs with the PLE and subsequent regenerations with brine, about 10% of virgin chelating exchanger (IRC-718) at the bottom of the bed was sufficient to eliminate any leakage of CU(II) from the bed. Visually, it was clear that the virgin IRC-718 was far from being saturated with Cu(II). (Upon copper loading, the chelating resin turns blue). Since regeneration conditions were far more extreme (6% NaCl), tests were carried out to measure quantitatively the relative amount of copper eluted from the bed during a typical regeneration cycle of the PLE. Ten bed volumes of spent 6%

NaCl regenerant were passed through an excess of virgin IRC-718 to intercept the entire amount of copper bled from Dow 3N—Cu. Following acid regeneration of IRC-718 and mass balance on copper, it was estimated that the copper eluted from the PLE during regeneration amounted to 0.0056% of the total copper loaded onto Dow 3N—Cu. From an engineering design viewpoint, 10% virgin IRC718 at the bottom of the column is quite sufficient to arrest copper bleeding from the PLE for over one hundred cycles of operation. Intermittently, after every hundred cycles, IRC-718 can be regenerated with dilute acid and the eluted copper can be reloaded onto the PLE. A previous study confirmed the high affinity of copper(II) toward Dow 3N even under highly acidic conditions (SenGupta A. K. and Zhu Y. (1992) Metals sorption by chelating polymers: a unique role of ionic strength. AIChE J. 38(1), 153–156).

Extremely low copper bleeding from the PLE during both exhaustion and regeneration cycles is a confirmation of the fact that commonly encountered cations, namely, $Na^+$ and $Ca^{2+}$ have negligible competing effects toward the parent chelating exchanger, Dow 3N. Sodium and calcium belong to Group IA and IIA in the periodic table, respectively. The electronic configurations of corresponding cations, $Na^+$ and $Ca^{2+}$, correspond to noble gas structures, namely, neon and argon. These cations (namely, $Na^+$ and $Ca^{2+}$) with the noble gas configuration are essentially hard spheres and can be sorbed only to negatively charged sites through coulombic interactions. However, the active chelating functional groups of Dow 3N have only nitrogen donor atoms with no negative charges as shown in FIG. 14. This intrinsic property of Dow 3N (i.e., lack of negative surface charges) is the underlying reason for its lack of affinity toward hard cations like $Ca^{2+}$, $Mg^{2+}$ and $Na^+$ (SenGupta A. K., Zhu Y., and Hauze D. (1991)). In contrast, the electronic configuration of copper(II) is $(Ar)3d^9$, which is far removed from a noble gas configuration. Compared to Group IA and IIA ions, Copper (II) is essentially a soft cation with strong Lewis acid characteristics. Consequently, copper(II) undergoes strong Lewis acid-base interaction with the nitrogen donor atoms of Dow 3N, leading to high affinity even under acidic conditions (Zhu, 1992). Hard cations are unlikely to displace copper(II) from the PLE, and that is why any fugitive copper bleeding during lengthy column runs and regenerations was practically absent.

Figure 13:
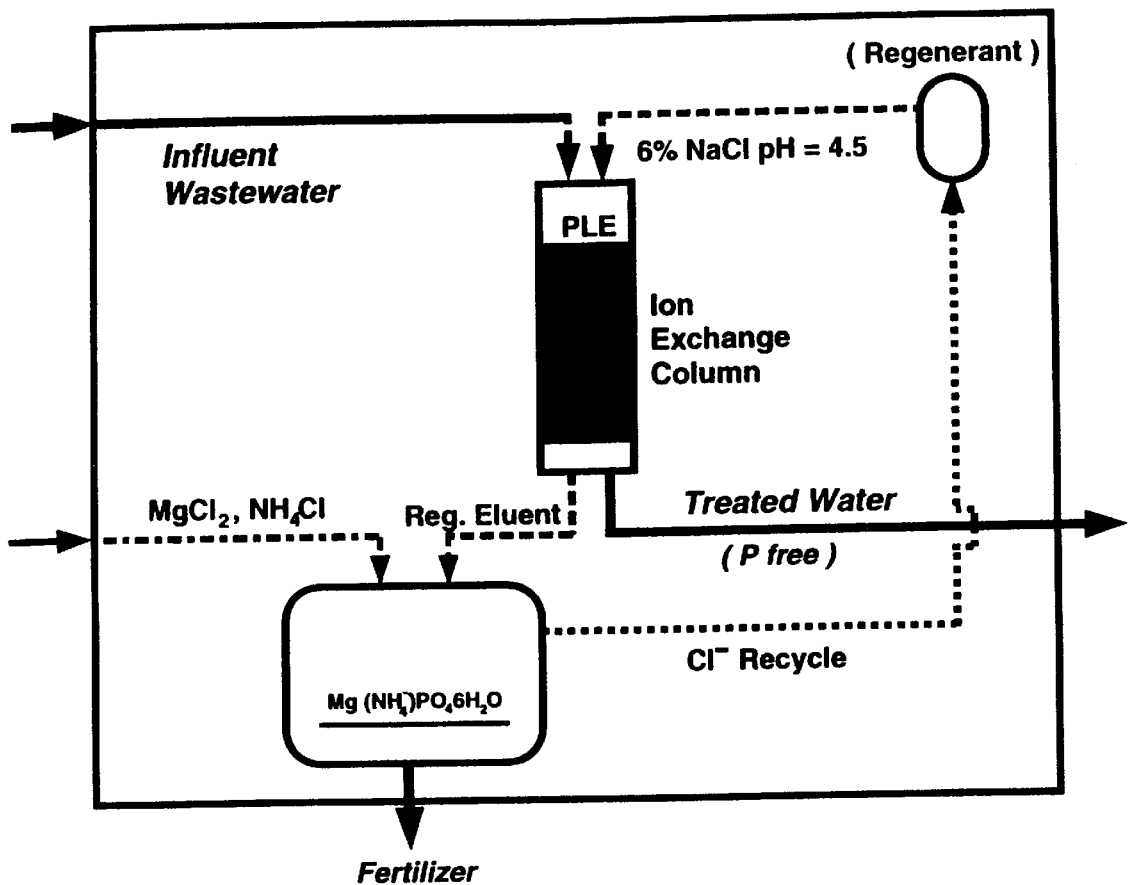
FIG. 13 is a schematic diagram of the overall process.

In FIG. 13, which is an overall process schematic illustrating phosphate removal, recovery and regenerant reuse, the secondary wastewater is the incoming stream, while the phosphorus-free treated water is the only exiting stream. No other significant waste solids and liquids are generated in the process. Two innocuous chemicals, namely, magnesium and ammonium (or potassium) chlorides are added to the spent regenerant stoichiometrically at a pH close to 9.0 to precipitate phosphate and produce a pure (99%) slow-release fertilizer (magnesium ammonium phosphate or magnesium potassium phosphate). The supernatant liquid (primarily brine) is free of phosphate and is recycled for reuse as the regenerant. Besides phosphate, no other buffer species is adequately present in the spent regenerant. The acid/base requirement for pH adjustment is, therefore, minimal. A mass-balance calculation using experimental results from the regeneration studies supports the fact that the chloride anions consumed during regeneration are replenished through the addition of magnesium and ammonium chlorides to the spent regenerant. The concentration of other accompanying species, such as sulfate, is more than two orders of magnitude lower than that of chloride in the recycled regenerant. As a result, the make-up brine requirement is insignificant, and the bleeding/replacement of the spent regenerant stream is minimal.

From an operational viewpoint, the entire process can be broken down into the following three major steps or cycles:

Phosphate Removal or Loading:

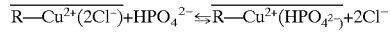

Phosphate Desorption or Regeneration:

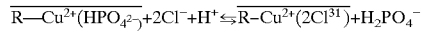

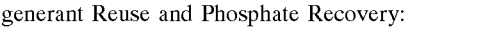

Regenerant Reuse and Phosphate Recovery:

$$MgCl_2 + NH_4Cl + HPO_4^{2-} + OH^- \leftrightarrows \downarrow Mg(NH_4)PO_4(s) + 3Cl^- + H_2O$$

For a typical secondary wastewater, the duration of the first step (removal) is estimated to be 24–72 hours, while the second and third step together will require approximately 3–6 hours.

No significant biological growth was observed within the PLE column while treating the secondary wastewater from the Bethlehem Wastewater Treatment Plant. The presence of Cu(II) in the polymer phase and use of 6% NaCl during intermittent regenerations is believed to have inhibited any major bacterial growth even in the presence of dissolved organic matter. A preliminary cost estimation for this process was carried out for removal of phosphate from the secondary wastewater of the Bethlehem Sewage Treatment Plant. For capacities ranging from 1.1 to 12.3 mgd, the estimated cost to reduce phosphate from 4 mg/L to less than 0.5 mg/L as P ranged from $.25 to $.35 per 1000 gallons of wastewater (Zhao, 1997).

It is universally recognized that a fixed-bed sorption process is operationally simple, requires virtually no start-up time and is forgiving toward fluctuations in feed compositions and ambient temperature. That is why fixed-bed sorption processes were tried for phosphate removals at pilot-scale levels in several places around the world (Eliassen, 1968; Kang, 1990; Nesbitt J. B. (1969) Phosphorus removal—the state of the art. Jour. WPCF. 41(5) 701–713). Since phosphate exists in wastewater predominantly as anions, polymeric strong base anion exchangers were used as sorbents in previous studies. However, lack of phosphate selectivity, poor efficiency of regeneration, organic fouling, and high operating cost due to regenerant chemicals were cited as major shortcomings affecting the overall viability of the fixed bed process. In all the foregoing studies, phosphate breakthrough from the fixed-bed column always occurred in less than two hundred bed volumes, necessitating frequent regenerations.

Although the laboratory experiments were geared toward treating secondary wastewater, the process of this invention is applicable to phosphate-laden industrial wastewater. Also, the proposed fixed-bed process can be used in series with Chemical Precipitation (CP) and Biological Nutrient Removal (BNR) processes to attain practically zero phosphate discharge.

The PLE showed much higher affinity toward phosphate and chromate over other competing anions including inorganic anions and dissolved organic matters commonly present in the secondary wastewater. Experimentally determined phosphate/sulfate separation factors for the PLE were approximately two orders of magnitude greater compared to those for strong-base anion exchangers used previously for phosphate removal from wastewater.

Electrostatic interactions (i.e., ion-pair formation) accompanied by Lewis acid-base interactions (i.e., formation of inner sphere complexes) are the underlying mechanisms contributing to PLE's high affinity toward phosphate. Also, the PLE conforms to ion-exchange stoichiometry, i.e., the sorption of a counter-ion is coupled with the desorption of an equivalent amount of other counter-ions.

A single-step brine regeneration at pH of 4.5 can consistently recover well over 90% phosphate in less than eight bed volumes.

During a lengthy column run with secondary wastewater, phosphate did not undergo any chromatographic elution, and no bacterial growth was observed within the fixed-bed column. It is postulated that the copper(II) present in the polymer phase inhibited any biological growth.

Figure 15:
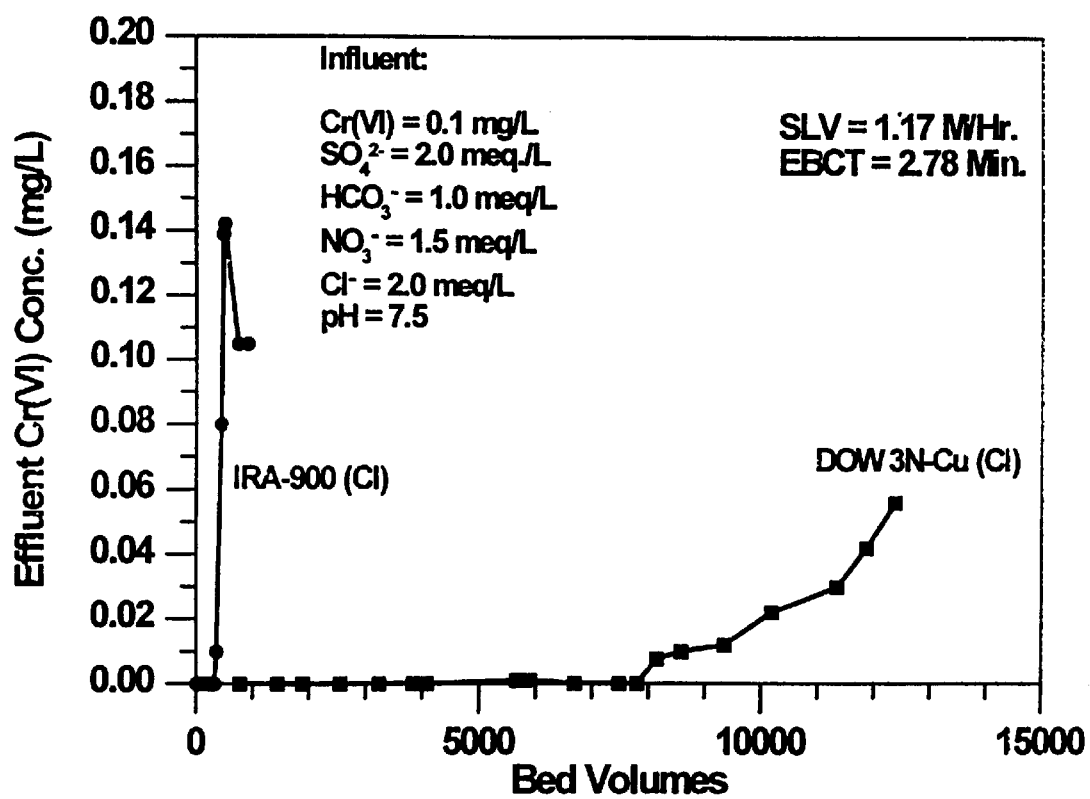
FIG. 15 is a graph comparing chromium breakthrough histories for IRA-900 and Dow 3N—Cu under identical experimental conditions.

To evaluate the parformance of the PLE in chromate removal, parallel, fixed-bed column runs were carried out using IRA-900 and Dow 3N—Cu under otherwise identical operating conditions. It is evident from FIG. 15 that the Cr(VI) removal capacity of the Dow 3N—Cu is far higher than that of IRA-900. More than 7000 bed volumes of practically chromium-free water were produced using Dow 3N—Cu. Other species broke through either immediately or shortly after the column run was commenced. This extraordinarily enhanced chromate removal is believed to be attributable to concurrent electrostatic, hydrophobic and Lewis acid-base interactions between the copper (II) ions and the chromate counter ions.

The PLE was found to be extremely durable, mechanically strong and chemically stable. The same PLE particles (spherical beads) were repeatedly used in more than one hundred cycles 20 of column run and batch tests for over three years without significant capacity drop or physical deterioration. Due to Dow 3N's very high affinity toward copper(II), no significant copper bleeding was observed during lengthy column runs and regenerations. The minor copper(II) bleeding was completely arresested by providing a small amount of a virgin chelating exchanger at the exit end of the column.

Among the modifications that can be made to the process are the derivation of the nitrogen donor atoms from polyimine functional groups instead of from bis-picolylamine functional groups, the use of oxygen instead of nitrogen as the donor atoms in the chelating functional group; the use of a polymethacrylate polymer matrix instead of styrene-divinylbenzene; and the use of sodium bicarbonate as a regenerant instead of sodium chloride.

In the preparation of the PLE, the ion exchange resin may be loaded with copper by saturating it with a solution of a cupric salt in which the anion of the cupric salt is the same as the predominant competing anion. For example, if the predominating competing anion is sulfate, the PLE can be prepared by loading it with cupric sulfate. Similarly, if the predominating competing anion is chloride, the PLE can be prepared by loading it with cupric chloride.

Other variations can be made to the invention without departing from its scope, as defined by the following claims.

We claim:

1. A process for treating contaminated water, containing contaminants, selected from the group consisting of phosphate and chromate ions, comprising the passage of said contaminated water through an ion exchange bed comprising a chemically stable polymer matrix having an electrically neutral chelating functional group with donor atoms from the group consisting of oxygen atoms and nitrogen atoms, and a Lewis-acid type metal cation bonded to the chelating functional group in a manner that the positive charges of the metal cation are not neutralized, whereby said contaminants are removed from the water.

2. The process according to claim 1 in which the chemically stable polymer matrix is a styrene-divinylbenzene copolymer.

3. The process according to claim 1 in which the chemically stable polymer matrix is a polymethacrylate.

4. The process according to claim 1 in which the donor atoms are nitrogen atoms derived from bis-picolylamine functional groups.

5. The process according to claim 1 in which the donor atoms are nitrogen atoms derived from polyimine functional groups.

6. The process according to claim 1 in which the Lewis-acid type metal cation is copper.

7. The process according to claim 1 in which the contaminated water contains phosphate ions.

8. The process according to claim 1 in which the contaminated water contains chromate ions.

9. The process according to claim 1 in which the passage of contaminated water through the ion exchange bed is interrupted upon exhaustion of the bed's ion exchange capacity, and during the interruption, the bed is regenerated with a regenerant from the group consisting of sodium chloride and sodium bicarbonate.

10. A process for selectively removing anions from contaminated water, the anions being from the group consisting of phosphate anions and chromate anions, wherein the contaminated water also contains a predominant competing anion, comprising the steps of:

obtaining an ion exchange resin comprising a chemically stable polymer matrix having an electrically neutral chelating functional group with donor atoms from the group consisting of oxygen atoms and nitrogen atoms;

loading the ion exchange resin with copper by saturating it with a solution of a cupric salt in which the anion of the cupric salt is the same as said predominant competing anion; and passing the contaminated water through an ion exchange bed comprising the copper-loaded ion exchange resin.

11. The process according to claim 10 in which the predominant competing anion is sulfate and the cupric salt is cupric sulfate.

12. The process according to claim 10 in which the predominant competing anion is chloride and the cupric salt is cupric chloride.

* * * * *